(12) United States Patent
Rudolf

(10) Patent No.: US 6,925,311 B2
(45) Date of Patent: Aug. 2, 2005

(54) METHODS FOR SYNCHRONIZING BETWEEN A BASE STATION AND A MOBILE STATION IN A CELL-BASED MOBILE COMMUNICATIONS SYSTEM

(75) Inventor: Marian Rudolf, Rennes (FR)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 674 days.

(21) Appl. No.: 09/797,592

(22) Filed: Mar. 5, 2001

(65) Prior Publication Data

US 2001/0021656 A1 Sep. 13, 2001

(30) Foreign Application Priority Data

Mar. 10, 2000 (EP) .......................................... 00400683

(51) Int. Cl.⁷ ............................ H04B 7/00; H04Q 7/20
(52) U.S. Cl. .................... 455/525; 455/440; 455/502; 455/437
(58) Field of Search ............................... 455/434, 440, 455/442, 525, 502, 436, 437, 439, 524; 370/331, 335, 342, 354, 503

(56) References Cited

U.S. PATENT DOCUMENTS

| | | | | |
|---|---|---|---|---|
| 6,097,953 A | * | 8/2000 | Bonta et al. ................. | 455/436 |
| 6,151,311 A | * | 11/2000 | Wheatley et al. ........... | 370/335 |
| 6,233,454 B1 | * | 5/2001 | Sato ............................ | 455/437 |
| 6,246,673 B1 | * | 6/2001 | Tiedemann et al. ......... | 370/333 |
| 6,449,482 B1 | * | 9/2002 | Johansson et al. .......... | 455/443 |
| 6,496,492 B1 | * | 12/2002 | Zeng .......................... | 370/331 |
| 6,526,039 B1 | * | 2/2003 | Dahlman et al. ......... | 455/67.16 |
| 6,603,735 B1 | * | 8/2003 | Park et al. .................. | 370/208 |

* cited by examiner

*Primary Examiner*—Nay Maung
*Assistant Examiner*—John J Lee
(74) *Attorney, Agent, or Firm*—Oblon, Spivak, McClelland, Maier & Neustadt, P.C.

(57) ABSTRACT

A method of isolating target cell signals originating from a target cell from active cell signals originating from an active cell in a cell search. The method receives a received signal, the received signal being either a target cell signal or an active cell signal, determines if the received signal has a specific characteristic that is within a range defined by at least two known specific characteristics of active cell signals, and performs an action based on a result of the determiners. The action is chosen from (1) if the received signal has a specific characteristic that is within the range, ignoring the received signal, and (2) if the received signal is not within the range, accepting the received signal.

5 Claims, 1 Drawing Sheet

METHODS FOR SYNCHRONIZING BETWEEN A BASE STATION AND A MOBILE STATION IN A CELL-BASED MOBILE COMMUNICATIONS SYSTEM

BACKGROUND OF THE INVENTION

1. Field of the Invention

The invention relates to methods for synchronizing between a base station and a mobile station in a cell-based mobile communications system.

2. Discussion of the Background

In cell based mobile communications systems, one area of concern is the amount of time and effort required for handover of a mobile station between cells.

In handover, a mobile station's transmission which acts with one cell is switched to another cell (hard handover) or a new cell is added to those servicing the mobile station (soft handover). Generally, the handover is accomplished through a multitude of steps. However, the first step in this multitude is to locate, e.g. to find timing and characteristics of a cell adjacent to a cell or a group of cells currently being used. For this, a procedure commonly known as a cell search is carried out by the mobile station.

A cell search involves the mobile station finding, acquiring, and synchronizing with the tuning and the characteristics and codes of the adjacent or target cell. To facilitate this search, all base stations, each of which services a specific cell, periodically transmit a primary synchronization code or PSC on a primary synchronization channel or P-SCH. All base stations in a communications system transmit the same PSC. Once a mobile station acquires the PSC from a target cell on that target cell's P-SCH, the mobile station uses the PSC to acquire slot synchronization to a cell. It should be noted that slot synchronization is required since, in the time domain, signals are structured into chips, slots, and frames, where one time slot lasts approximately 666 us, a frame lasts for 10 ms or 15 slots and each slot is subdivided into 2560 chips.

Once a mobile station acquires slot synchronization, further steps, such as frame synchronization and scrambling code identification, are carried out. However, these further steps are beyond the scope of this application.

What is of concern is the amount of time and processing power required for mobile stations to acquire a target cell's PSC and P-SCH.

Generally, mobile stations receive signals from possible or candidate target cells while keeping track of already known or active cells. These signals are received, filtered, and correlated with a local copy of the PSC by the mobile station. The mobile station correlates the received complex signal with a local replica of the PSC at all possible time positions over one slot length. The mobile station then sums up, generally non-coherently, a slot profile composed of correlation values for a set number of slots. This is done by summing up the squared amplitude values at specific time positions for every one of the set number of time slots. The mobile station then chooses the largest correlation peak in the slot profile as the time position of the P-SCH of a target cell. It should be noted that the slot profile contains the correlation values for signals which repeat every slot. These signals from the base stations are repeated at approximately the same time position for every slot.

Unfortunately, in most handover situations, the power levels of the signals from active cells and target cells which are received by the mobile station usually have an approximately constant magnitude. Thus, a mobile station may have a slot profile similar to that shown in FIG. 1 where the correlation output of an active cell signal is approximately similar if not greater in magnitude to a correlation output of a target cell's signal. The mobile station which chooses the cell or the cells that correspond to the signals of correlation output in the slot profile that have one of the strongest magnitude can choose the signals of these active cells in its cell search. Since this is not what is desired, the cell search must be restarted, requiring more time and processing power from the mobile station.

SUMMARY OF THE INVENTION

However, in the Wide band Code-Division Multiple Access in Frequency Division Duplex standard, mobile stations continuously keep track of the chip, slot, frame timing, and channel profile of its active cells. What is therefore needed is a method and an apparatus which takes advantage of this data to avoid acquiring the P-SCH of active cells, thereby facilitating target cell acquisition.

The invention provides a method and an apparatus which facilitates faster acquisition of target cell signals. Since the mobile station already tracks the slot and frame timing of its active cells, the mobile station has a record of when active cell signals are expected to be received. Thus, if a signal is received during a time interval when active cell signals are expected, this signal is ignored and not passed to the next step of the cell search procedure. If a signal is received outside of the time intervals when active cell signals are expected, this signal is accepted and passed to the next step of the cell search procedure. Thus, by ignoring signals which are expected to be from an active cell, target cell signals are isolated, leading to faster target cell acquisition.

In a first embodiment, the invention provides a method of isolating target cell signals originating from a target cell from active cell signals originating from an active cell in a cell search, the method comprising:

a) receiving a signal, the received signal being either a target cell signal or an active cell signal;

b) determining if the received signal has a specific characteristic that is within a range defined by at least two known specific characteristics of active cell signals; and c) performing an action based on a result of step c), the action being chosen from the group comprising:

c1) if the received signal has a specific characteristic which is within the range, ignoring the received signal; and c2) if the received signal is not within the range, accepting the received signal.

In a second embodiment, the invention provides a method of isolating target cell signals originating from a target cell from active cell signals originating from an active cell in a cell search, the method comprising:

a) receiving a signal, the received signal being either a target cell signal or an active cell signal;

b) determining if a reception time of the received signal is within a critical time interval when active cell signals are expected to be received; and c) performing an action based on a result of step c), the action being chosen from the group comprising:

c1) ignoring the received signal if the reception time is within the critical time interval;

c2) accepting the received signal if the reception time is not within the critical time interval.

In a third embodiment, the invention provides a method of isolating target cell signals originating from a target cell from active cell signals originating from an active cell in a cell search, the method comprising accepting all incoming received signals at all times except for a critical time interval when active cell signals are expected to be received.

In a fourth embodiment, the invention provides a device for isolating target cell signals originating from a target cell from active cell signals originating from an active cell in a cell search, the device comprising:
- a filter/correlator for filtering and correlating a received signal with a local copy of a primary synchronization code;
- a null generator;
- a signal acquisition module;
- switch means coupled to the null generator, the module, and the filter/correlator;
- memory means for storing information relating to timing information and channel characteristics of at least one active cell; and
- a control unit controlling the switch means and receiving timing information and channel characteristics from the memory means;

wherein the control unit controls the switch means to selectively couple the filter/correlator to the module or the null generator to the module.

BRIEF DESCRIPTION OF THE DRAWINGS

A better understanding of the invention will be obtained by considering the detailed description below, with reference to the following drawings in which.

DESCRIPTION OF THE PREFERRED EMBODIMENTS

Figure 2:
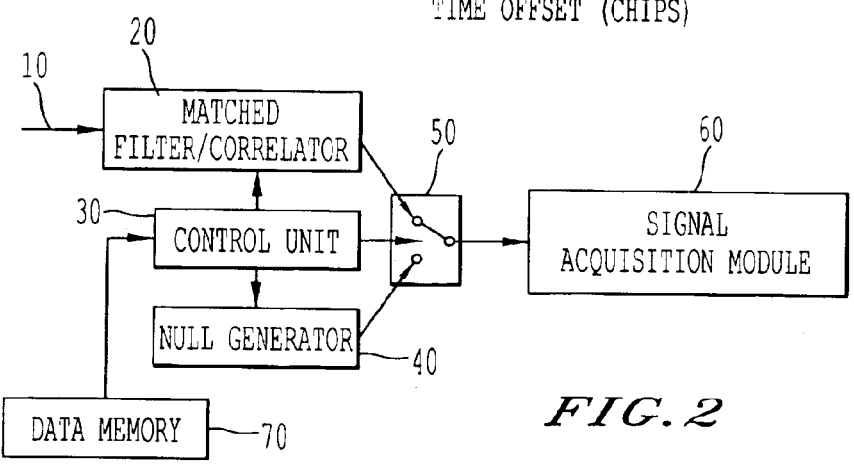
FIG. 2 is a block diagram of an embodiment of the invention.

Referring to FIG. 2, a block diagram of the invention is illustrated. A received signal 10 is transmitted to a matched filter/correlator 20. The matched filter/correlator 20 has a local copy of the PSC which it correlates with the received signal 10. A control unit 30 is coupled to the matched filter/correlator 20 and a null generator 40. Also coupled to the control unit 30 is a switch means 50 which is further coupled to a signal acquisition module 60. The signal acquisition module 60 receives either the output of the filter/correlator 20 or nulls from the null generator 40 depending on the status of the switch means 50. The module 60 performs the further steps of the cell search procedure such as choosing the largest peak of the correlation output.

The control unit 30 receives the timing information and channel profiles of the active cells from a data memory 70 which stores and tracks such information for the mobile station. In this context, all of the components noted here are contained within a mobile station.

Because the PSC transmission of base stations are periodic in that they generally occur within the same time interval in one time slot, this timing information is used by the control unit to isolate the target cell signals. The control unit thus knows, for every time slot, the time offset for each active cell signal. A time offset is the time from the beginning of a time slot when an event is expected. Thus, if active cell A transmits its signals between 100 and 200 chips from the beginning of the time slot, then the offsets for the active cell signals for active cell A's must be between 100 and 200 chips.

Since the control unit knows, from the active cell information found in the data memory 70, when the active signals are to be expected, the control unit can ignore all signals received within that critical time interval when active cell signals are expected. In the example given above, the critical time interval for active cell A is between 100 and 200 chips in every time slot. The time offset for the beginning of the critical time interval is thus 100 chips from the beginning of the slot and the time offset for the end of the critical time interval is 200 chips from the beginning of the slot.

From the above, the control unit can, once the received signal is received, check the reception time of that received signal relative to the beginning of the current time slot. If the reception time of the received signal is within the critical time interval for the current time slot, the control unit switches the switch means to couple the null generator 40 to the module 60. This effectively ignores the received signal. If, on the other hand, the reception time of the received signal is not within the critical time interval for the current time slot, the control unit switches the switching means to couple the matched filter/correlator to the module 60. This causes the output of the matched filter/correlator to be fed to the module 60, effectively causing the acceptance of the received signal.

Alternatively, to avoid having the control unit repeatedly check the reception time of the received signal with the active cell signal timing information, the control unit can, as a default position, cause the continuous acceptance of the received signal. Then, when a critical time interval is present, the control unit switches the switch means to couple the null generator to the module 60. Thus, from the example above, if active cell A has a critical time interval between 100 and 200 chips in every time slot, the switch means couples the filter/correlator to the module 60 at all times except between 100 and 200 chips as measured from the beginning of a time slot. During this critical time interval, the null generator is coupled to the module 60 by the switch means. The null generator thus feeds nulls or zeroes to the module during the critical time interval.

The methods disclosed above can be expanded to include multiple active cells in a mobile station's active cell set. Therefore, if a mobile station is aware of active cells B, C, and D, then there will be three critical time intervals when the output of the filter/correlator will not be transmitted to the module 60 for further processing.

Figure 1:
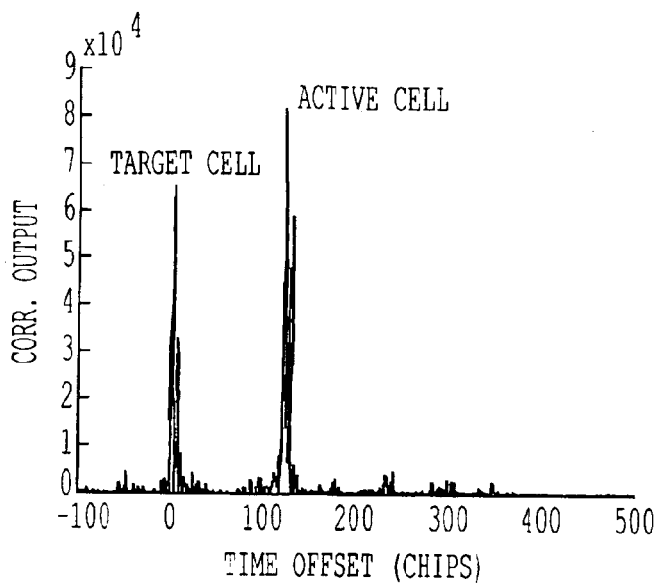
FIG. 1 is an illustration of a slot profile with undesired contributions from an active cell.
Figure 3:
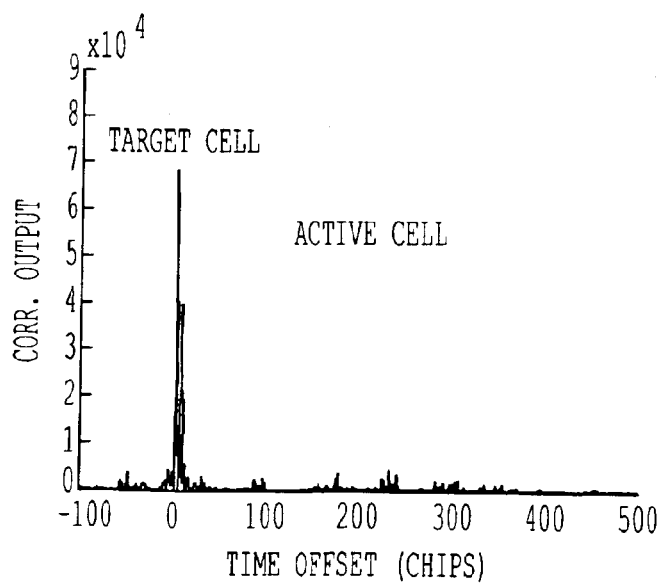
FIG. 3 is a slot profile of similar to FIG. 1 after the invention has been implemented.

FIG. 3 illustrates the slot profile for a mobile station implementing the invention, As can be seen by contrasting FIGS. 1 and 3, the peak due to the active cell signal has been eliminated. Since the active cell signals are not accepted by the module 60 because of the control unit and the switching means, these signals are not included in correlation output.

What is claimed is:

1. A method of isolating target cell signals originating from a target cell from active cell signals originating from an active cell in a cell search, the method comprising:

a) receiving a received signal, the received signal being either a target cell signal or an active cell signal;

b) determining if the received signal has a specific characteristic that is within a range defined by at least two known specific characteristics of active cell signals; and c) performing an action based on a result of step b), the action being chosen from the group comprising:
  c1) if the received signal has a specific characteristic which is within the range, ignoring the received signal by generating a null signal to replace the received signal, to isolate the target cell from which the received signal is received; and
  c2) if the received signal is not within the range, accepting the received signal.

2. A method as claimed in claim 1 wherein the specific characteristic is a reception time of the received signal and the specific known characteristics of active cell signals are the earliest expected reception time of active cell signals and the latest expected reception time of active cell signals, and wherein the range is a time interval between the earliest reception time and the latest reception time.

3. A method of isolating target cell signals originating from a target cell from active cell signals originating from an active cell in a cell search, the method comprising:
  a) receiving a received signal, the received signal being either a target cell signal or an active cell signal;
  b) determining if a reception time of the received signal is within a critical time interval when active cell signals are expected to be received; and
  c) performing an action based on a result of step b), the action being chosen from the group comprising:
    c1) ignoring the received signal if the reception time is within the critical time interval by generating a null signal to replace the received signal, to isolate the target cell from which the received signal is received;
    c2) accepting the received signal if the reception time is not within the critical time interval.

4. A device for isolating target cell signals originating from a target cell from active cell signals originating from an active cell in a cell search, the device comprising:
  a filter/correlator for filtering and correlating a received signal with a local copy of a primary synchronization code;
  a null generator;
  a signal acquisition module;
  switch coupled to the null generator, the module, and the filter/correlator;
  a memory configured to store information relating to timing information and channel characteristics of at least one active cell, including storing a critical timing interval when active cell signals of the at least one active cell are expected to be received; and
  a control unit controlling the switch and receiving timing information and channel characteristics from the memory,
  wherein the control unit controls the switch to selectively couple the filter/correlator to the module at times other than the critical timing interval and to selectively couple the null generator to the module during the critical timing interval.

5. A method of isolating target cell signals originating from a target cell from active cell signals originating from an active cell in a cell search, the method comprising:
  a) receiving a received signal, the received signal being either a target cell signal or an active cell signal;
  b) determining if the received signal has a specific characteristic that is within a range defined by at least two known specific characteristics of active cell signals; and
  c) performing an action based on a result of step b), the action being chosen from the group comprising:
    c1) if the received signal has a specific characteristic which is within the range, ignoring the received signal to isolate the target cell from which the received signal is received; and
    c2) if the received signal is not within the range, accepting the received signal,
  wherein the specific characteristic is a reception time of the received signal and the specific known characteristics of active cell signals are the earliest expected reception time of active cell signals and the latest expected reception time of active cell signals, and wherein the range is a time interval between the earliest reception time and the latest reception time.

* * * * *